Figures 1, 2:
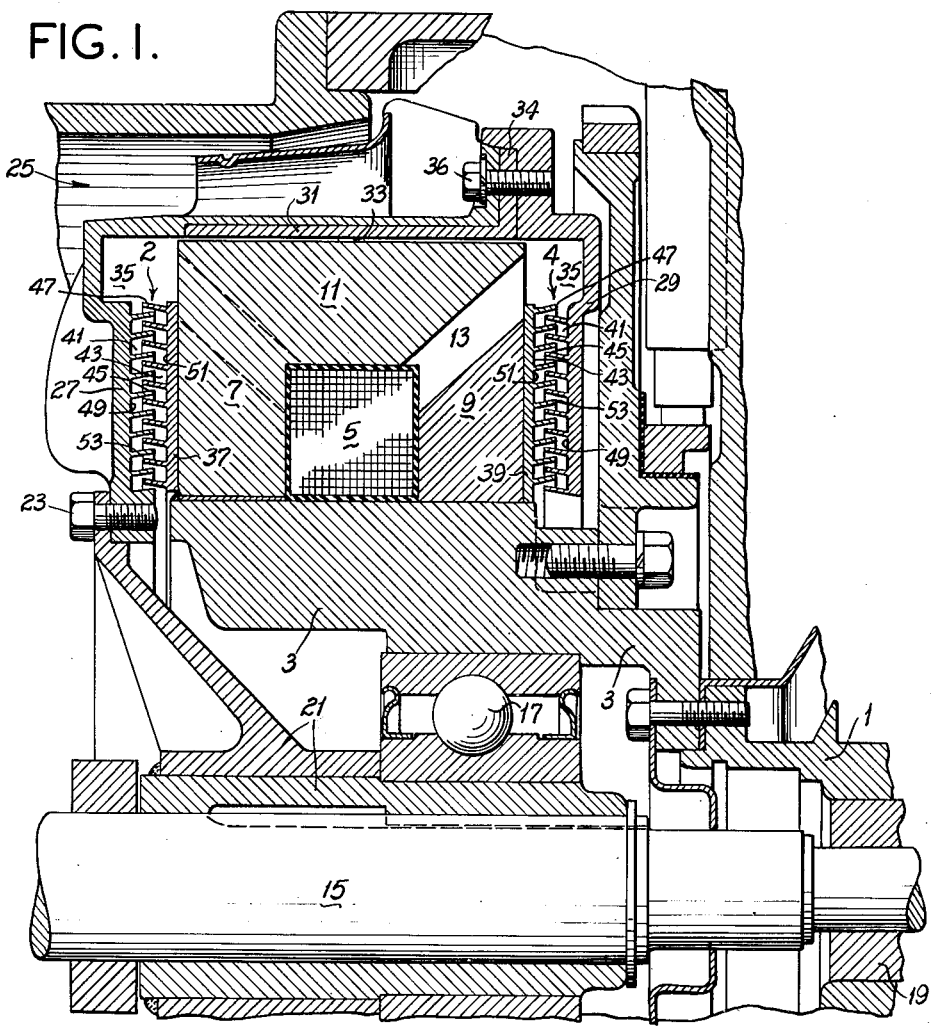

Feb. 26, 1952 A. WINTHER 2,587,077
LABYRINTH SEAL
Filed June 25, 1948

Anthony Winther
Inventor.
Haynes and Koenig
Attorneys.

Patented Feb. 26, 1952

2,587,077

UNITED STATES PATENT OFFICE 2,587,077

LABYRINTH SEAL

Anthony Winther, Kenosha, Wis., assignor to Martin P. Winther, as trustee

Application June 25, 1948, Serial No. 35,191

2 Claims. (Cl. 286—10)

This invention relates to labyrinth seals, and with regard to certain more specific features, to such seals for rotary apparatus.

Among the several objects of the invention may be noted the provision of an improved form of labyrinth seal for apparatus which has relatively rotary parts between which is carried a fluid materal such as water, oil, or flowing mixtures and the like; the provision of a seal of the class described for large radii of action in which, although wide non-rubbing clearances are provided, there is insurance against escape of fluid either while the apparatus is rotary or stationary; and the provision of a seal of this class which is easy to manufacture, install and maintain. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is an axial section through apparatus embodying the invention; and Fig. 2 is an enlarged detail of part of the left-hand sealing parts shown in Fig. 1.

Similar reference characters indicate corresponding parts throughout the several views of the drawings.

In the drawings and in the following description, inly such parts of exemplary apparatus embodying the invention are enumerated and discussed as are necessary to a full understanding. Referring now more particularly to Fig. 1, there is shown at numeral 1 the flanged end of a crankshaft to which is attached the inner magnetic drum 3 of a field member. Drum 3 carries a toroidal field coil 5 and attached magnetic rings 7 and 9 having interdigitated magnetic pole extensions 11 and 13, respectively. The members thus far described rotate as a unit.

At numeral 15 is shown a driven shaft. This is supported within the drum 3 on bearing 17 and piloted in a bearing 19 carried in the end of the crankshaft 1. Splined to the shaft 15 is a hub assembly 21, to which is bolted at 23 a two-part casing 25 made up of assembled members 27 and 29. In one of the members 27 is carried a magnetic inductor drum insert 31, which surrounds the pole members 11 and 13 at a magnetic gap 33. A flange 34 of the insert 31 is held between the parts 27 and 29 by means of fasteners 36. The parts of the members 27 and 29 are for certain applications preferably nonmagnetic, being in the present case formed of aluminum. However, this is not necessary in all applications of the invention. The members 27 and 29 provide closure heads at opposite ends of the field member constituted by the parts 3—13. They also are formed to provide internal reservoirs 35 for fluid which it is desired to carry in the apparatus.

On opposite sides of the magnetic rings 7 and 9 are carried side rings 37 and 39, respectively. These are preferably, though not necessarily, nonmagnetic (aluminum for example). To prevent leakage of fluid (such as oil, water or magnetic mixtures) carried in the reservoirs 35, the adjacent members of each pair of elements 27, 37 and 29, 39 are formed as labyrinth seals 2 and 4. It is to improvements in these seals that the present invention is directed. Ordinarily such seals are formed by cutting staggered axial (cylindric) grooves alternately in a pair of relatively rotary members and interdigitating the cylindric collars thus left.

The present invention comprises the provision of conical grooves 41 and 43 forming conical collars 45 and 47 respectively. The sides of these collars 45 and 47 slope at about 10° to the axis of rotation of the coaxial supporting shafts. This leaves a complementary angle of 80° outside of each collar with respect to the radial plane of the respective supporting parts. The radial spacing or pitch between successive conical collars 45 or 47 is such that with a given depth E of groove 41 or 43 used, the overlap O will preferably be approximately one-third of the spacing between the inner faces 49 and 51 of members such as 27 and 37 for example (see Fig. 2). This makes the overlap O approximately one-half of the common depth of all flaring frustums constituted by the collars 45 and 47.

While the thickness of the wall of each conical cup is a matter of choice, it is preferable that each wall be as thin as is consistent with proper rigidity and ease of manufacture, as called for by the particular material composing the cups. In the present case this is aluminum and a $\frac{1}{32}$ inch wall thickness is satisfactory for a distance between walls 49 and 51 of ⅜ inch. This makes the heighth of each cup about ¼ inch. The reason for using a minimum wall thickness is to accommodate as many interdigitated cups as possible in a given radial increment.

In view of the above, it will be seen that the collars 45 and 47, considered as hollow frustums of cones (or cups), have their open ends larger than their closed ends, said open ends being interdigitated. The arrangement is such that there is definite clearance and no rubbing between the open edge 53 of any cup and the adjacent one. The result is a completely free-running seal with no rubbing friction at any relative speed at any radius. Hence the device is applicable to large sealing radii in high-speed apparatus.

In operation the driving shaft 1 drives the driven shaft 15 by reason of an electromagnetic coupling between the field poles 11, 13 and the inductor drum 31. This may occur with some or no slip. The exact operation in this respect is not of importance to the present invention. It suffices to say that in various forms of apparatus of the class concerned, a liquid is desired between the field and inductor members. This may be water, oil, creamy mixtures of magnetic particles and oil, or the like. For instance in a dynamometer application cooling water might be used and in a magnetic coupling a magnetic slurry might be used. Such liquids are spun outwardly under rotation. Under stationary conditions the liquid tends to gravitate to the bottom of the case 25. In doing so, it drops onto the outermost collars 47, which act as V-shaped channels guiding the fluid around to the bottom without possibility of escape unless the channel overflows. Any overflow that may occur from the outermost channel or channels is taken up by more inwardly located ones and a sufficient number are provided to assure that cascading cannot occur over all collars before all the liquid to be accommodated in the bottom of the case 25 has found its way down to that point.

When the apparatus starts from rest, any collection of liquid at the bottom that has found its way into the bottommost portions of the channels 41 and 43 clings to collars 45 and 47. As these rotate, the liquid under centrifugal force, instead of being trapped within the collars, seeks its way outward along the sloping inner conic surfaces. Thus it cascades radially outward, finally finding its way into the reservoirs 35 and into the magnetic gap 33.

In the above description, the details of Fig. 2 have been recited in connection only with the left-hand seal, but it is to be understood that the same details apply to the right-hand seal. In fact, Fig. 2 could be considered to represent a structure in either the left or the right-hand seal.

It will be noted that the configuration of the cross section of each seal is of an overlapping herringbone nature. This is due to the interdigitated arrangement of the large open ends of the conical frustums.

In view of the above, it will be seen that the several objects of the invention are achieved and other advantageous results obtained.

As many changes could be made in the above constructions without departing from the scope of the invention, it is intended that all matter contained in the above description or shown in the accompanying drawings shall be interpreted as illustrative and not in a limiting sense.

I claim:

1. A labyrinth seal for use between relatively rotary coaxial parts, said parts providing an annular reservoir for flowable non-gaseous material, said rotary parts having axially spaced and radially arranged opposing faces, comprising a series of concentrically arranged conical open-ended rigid frustums extending from one part away from the axis and coaxial therewith and positioned inside the reservoir, and a second series of oppositely directed hollow concentrically arranged conical open-ended rigid frustums extending from the other part away from the axis and coaxial therewith and also positioned inside the reservoir, the sides of the frustums sloping with respect to the axis of rotation an amount substantially smaller than their complementary slopes with respect to a radial plane, whereby the open ends of the frustums may be interdigitated a substantial amount while allowing large enough clearances therebetween that any of said flowable material that may enter between the frustums during standstill will freely return to the reservoir under centrifugal force induced by rotation of the rotary members.

2. A labyrinth seal for use between relatively rotary coaxial parts, said parts providing an annular reservoir for flowable magnetic material of a non-gaseous nature, said rotary parts having axially spaced and radially arranged opposing nonmagnetic faces, comprising a series of concentrically arranged conical open-ended rigid nonmagnetic frustums extending from one part away from the axis and coaxial therewith and positioned inside the reservoir, and a second series of oppositely directed hollow concentrically arranged conical open-ended rigid nonmagnetic frustums extending from the other part away from the axis and coaxial therewith and also positioned inside the reservoir, the sides of the frustums sloping with respect to the axis of rotation an amount substantially smaller than their complementary slopes with respect to a radial plane, whereby the open ends of the frustums may be interdigitated a substantial amount while allowing large enough clearances therebetween that any magnetic flowable material which may escape from the reservoir and enter between the frustums during standstill may freely return to the reservoir under centrifugal force induced by rotation of the rotary members.

ANTHONY WINTHER.

REFERENCES CITED

The following references are of record in the file of this patent:

UNITED STATES PATENTS

| Number | Name | Date |
|---|---|---|
| 1,689,735 | Losel | Oct. 30 1928 |
| 1,831,224 | Baumann | Nov. 10, 1931 |
| 2,172,222 | Podbielniak | Sept. 5, 1939 |